United States Patent [19]

Albee, Jr. et al.

[11] 4,436,863

[45] Mar. 13, 1984

[54] USE OF ETHYLENE-VINYL ACETATE COPOLYMERS AND OXIDIZED HIGH DENSITY POLYETHYLENE HOMOPOLYMERS AS PROCESSING AIDS FOR TALC FILLED POLYPROPYLENE COMPOUNDS

[75] Inventors: Paul J. Albee, Jr., Bensalem, Pa.; Patricia E. Burdick, Budd Lake, N.J.

[73] Assignee: Allied Corporation, Morris Township, Morris County, N.J.

[21] Appl. No.: 259,406

[22] Filed: May 1, 1981

[51] Int. Cl.$^3$ .............................. C08K 3/34; C08K 5/10
[52] U.S. Cl. ..................................... 524/451; 524/275; 524/311; 524/524; 524/563
[58] Field of Search ............... 524/451, 563, 311, 275, 524/524; 525/222

[56] References Cited

U.S. PATENT DOCUMENTS

| | | | |
|---|---|---|---|
| 3,457,216 | 7/1969 | Dew | 524/451 |
| 3,658,741 | 4/1972 | Knutson | 524/555 |
| 3,888,911 | 6/1975 | Dench et al. | 260/544 Y |
| 3,976,618 | 8/1976 | Takida et al. | 524/451 |
| 4,209,437 | 6/1980 | Fischer | 524/311 |
| 4,222,913 | 9/1980 | Cooper | 525/222 |
| 4,232,132 | 11/1980 | Grigo et al. | 525/222 |
| 4,243,576 | 1/1981 | Fisher et al. | 524/451 |

FOREIGN PATENT DOCUMENTS

| | | | |
|---|---|---|---|
| 2811548 | 9/1979 | Fed. Rep. of Germany | 525/222 |
| 2811550 | 9/1979 | Fed. Rep. of Germany | 525/222 |
| 51-5315 | 1/1976 | Japan | |
| 55-34271 | 3/1980 | Japan | |
| 56-26797 | 3/1981 | Japan | |
| 57-165468 | 10/1982 | Japan | 524/275 |

OTHER PUBLICATIONS

Derwent Abst 29917 C/17 Toyoda (J55034271) 3-10-1980.
Derwent Abst 16350 W/10 Nippon Gohsei (DT2438289) 2-27-1975.
Derwent Abst 31823 D/18 Chisso Asahi (J56026797) 3-14-81.
Derwent Abst 73950 D/41 Hoechst (DE3011438) 10-1-81.
Derwent Abst 46547 D/26 (J56050938) Tombow.
Derwent Abst 15871 X/09 J51005315, 1-17-1976.
Chem Abst 84-151709y Arima Japan 76-05315, 1-17-1976.

*Primary Examiner*—Melvyn I. Marquis
*Assistant Examiner*—Herbert J. Lilling
*Attorney, Agent, or Firm*—Richard A. Negin; Patrick L. Henry

[57] ABSTRACT

A talc filled polypropylene composition containing 0.1 to 10 percent of a processing aid. The processing aid is a low molecular weight ethylene-vinyl acetate copolymer or a low molecular weight oxidized high density polyethylene.

14 Claims, No Drawings

USE OF ETHYLENE-VINYL ACETATE COPOLYMERS AND OXIDIZED HIGH DENSITY POLYETHYLENE HOMOPOLYMERS AS PROCESSING AIDS FOR TALC FILLED POLYPROPYLENE COMPOUNDS

DESCRIPTION

BACKGROUND OF THE INVENTION

This invention relates to polypropylene compositions; more particularly, the invention relates to the use of specified processing aids in talc filled polypropylene compositions. Polypropylene is a well known and widely used polyolefin. Polypropylene can be processed by methods common to thermoplastics. Various fillers including talc can be used in polypropylene compositions.

Talc is particularly preferred because it is readily available at low cost. Its inertness makes it an excellent extender with very little sacrifice to the polymer's physical properties. Additionally, talc increases the polypropylene stiffness, impact resistance and strength.

However, the addition of talc to polypropylene affects various properties including surface appearance and the flow of the molten composition. The melt flow rate of the composition is important because it relates to the length of molding cycles. Additional properties of talc filled polypropylene composition which are of concern are the impact resistance and the affect of heat as measured by the heat deflection temperature (HDT) which is also known as the heat distortion temperature.

SUMMARY OF THE INVENTION

The present invention is a composition comprising polypropylene and from 1 to 50 percent based on the weight of the polypropylene of talc. From 0.1 percent to 10 percent based on the weight of the polypropylene of a processing aid selected from the group consisting of oxidized high density polyethylene and ethylene vinyl acetate copolymer is added. The oxidized high density polyethylene has a Brookfield viscosity at 149° C. of from 5,000 to 30,000 centipoises. A preferred oxidized high density polyethylene has a Brookfield viscosity at 149° C. of from 20,000 to 30,000 centipoises, and an acid number of from 10 to 30 milligrams of potassium hydroxide to neutralize one gram of sample (mg KOH/g) and more preferably from 18 to 24 mg KOH/g. The ethylene vinyl acetate copolymer has from 2 to 45 percent by weight of the vinyl acetate moiety, and a Brookfield Viscosity at 140° C. of from 300 to 700 centipoises. A preferred ethylene vinyl acetate copolymer has from 10 to 60 percent by weight of the vinyl acetate moiety and a Brookfield viscosity at 140° C. of about 475 to 500 centipoises. This preferred ethylene-vinyl acetate copolymer and oxidized high density polyethylene result in a free flowing powder which can be easily preblended with the talc. Another preferred ethylene-vinyl acetate copolymer which behaves as a processing aid and additionally improves impact resistance has a Brookfield viscosity at 140° C. of from 300 to 400 centipoises.

DESCRIPTION OF THE PREFERRED EMBODIMENTS

The present invention is a composition comprising polypropylene, a talc filler and a processing aid. There is from 1 to 50 percent based on the weight of the polypropylene of talc and from 0.1 to 10 percent based on the weight of the polypropylene of the processing aid. The processing aid is selected from the group consisting of oxidized high density polyethylene and ethylene vinyl acetate copolymer.

Polypropylene is a well known thermoplastic olefin polymer. A brief review of polypropylene is found in "Modern Plastics Encyclopedia" 1979–1980, published by McGraw Hill Inc., New York, New York at page 82. Briefly, polypropylene is made by polymerizing high purity propylene gas in low pressure reactors, utilizing heterogeneous catalysts of the type discovered by Ziegler. It is a crystalline polymer and has a density of about 0.90 grams per cubic centimeter. Polypropylene is a thermoplastic material which can be extruded and formed by methods used with other known thermoplastic compositions.

The talc used in the present invention includes natural hydrous magnesium silicate. Preferably, the talc should be in powder form having the particle size less than 35 mesh, and preferably between 100 mesh and 400 mesh. There can be from 1 to 50 percent, and preferably from 5 to 45 percent based on the weight of the polypropylene of talc. Different applications generally require different filling levels. Highly filled applications generally call for from 25 to 40 percent, based on the weight of the polypropylene, of talc. These applications include electrical equipment and components, internal appliance parts, and under the hood automotive uses. Typically, these applications require a high heat distortion temperature and flexural properties. Surface appearance, although of concern, is not critical. Polypropylene compositions containing less filler, generally 10 to 25 percent, based on the weight of the polypropylene, of talc include uses such as the external housings for business machines, bookcases, and interior car trim. In these applications, impact strength and surface appearance are very important.

Where the composition of the present invention is to be molded, all compositions should have as fast a mold cycle time as possible. This requires high flow of the melted composition. It has been found that the use of a processing aid selected from the group consisting of oxidized high density polyethylene and ethylene-vinyl acetate copolymers improves the surface gloss, eliminates flow lines, and increase the flow rate of the molten polymer when added to the talc filled polypropylene composition. The improved flow properties enable injection molding pressures to be reduced, and processing temperatures to be reduced. The ethylene-vinyl acetate groups of the ethylene vinyl acetate and the oxidized portion of the oxidized polyethylene are polar groups. These groups help to align the talc to maintain impact resistance. The polar portions also help the polypropylene to flow more easily. The oxidized high density polyethylene is a thermally stable material.

The ethylene-vinyl acetate copolymer is used as a processing aid at from 0.1 to 10 percent, preferably from 1 to 5 percent, and more preferably from 3 to 5 percent based on the weight of the polypropylene. The ethylene-vinyl acetate copolymer has from 2 to 45 percent by weight and preferably from 10 to 16 percent by weight of the vinyl acetate moiety. The ethylene-vinyl acetate copolymer has a Brookfield viscosity at 140° C. of from 300 centipoises to 700 centipoises. Talc filled polypropylene compositions containing ethylene-vinyl acetate copolymers result in better flow of the molten composition and excellent surface appearance. Additionally, it has been found that using ethylene-vinyl acetate copolymer having a vinyl acetate moiety of 10 to 16 percent, and preferably 10 to 14 percent by weight based on the total weight of the ethylene vinyl acetate copolymer, and a Brookfield viscosity at 140° C. of from 450 to 525 centipoises, and preferably 475 to 500 centipoises, can be ground into a free flowing powder having an average particle size of less than 10 mesh, preferably from 10 to 100 mesh, more preferably from 10 to 50 mesh, and most preferably from 20 to 35 mesh, and results in excellent surface appearance, fast melt flow rate while maintaining impact resistance of talc filled polypropylene compositions.

Ethylene-vinyl acetate having a Brookfield viscosity at 140° C. of from 300 centipoises to about 500 centipoises results in excellent surface appearance, a fast melt flow rate and improved impact resistance of talc filled polypropylene compositions.

The ethylene-vinyl acetate copolymer of the type useful in the composition of the present invention can be made in accordance with the disclosure in U.S. Pat. Nos. 3,658,741; 3,888,911; and 3,909,280. The ethylene-vinyl acetate copolymers preferably have a molecular weight of from about 500 to 10,000, and more preferably from 500 to 5,000.

Ethylene-vinyl acetate copolymers useful in the composition of the present invention are summarized in Table I below. EVA-8 is the most preferred ethylene-vinyl acetate copolymer.

TABLE I

| EVA | Soften- ing Point °C. (ASTM E-28) | Hardness dmm (ASTM D-5) | Density g/cc (ASTM D1505) | Viscosity 140° C. (Brookfield) | Wt % vinyl acetate |
|---|---|---|---|---|---|
| 1 | 95 | 9.5 | 0.92 | 550 | 14 |
| 2 | 102 | 6.0 | 0.93 | 550 | 8 |
| 3 | 101 | 7.0 | 0.91 | 450 | 2 |
| 4 | 104 | 4.0 | 0.92 | 450 | 2 |
| 5 | 96 | 8.5 | 0.91 | 550 | 11 |
| 6 | 60 | 80 | 0.93 | 600 | 26 |
| 7 | Liquid | — | 0.94 | 350 | 40 |
| 8 | — | 7.0–13.0 | — | 475–500 | 10–14 |

It is preferred to use ethylene-vinyl acetate copolymers as processing aids for polypropylene compositions containing less filler. A preferred composition is polypropylene containing 10 to 25 percent based on the weight of the polypropylene of talc, and 1 to 5 percent and preferably, 3 to 5 percent, based on the weight of the polypropylene, of EVA-8.

Talc filled polypropylene compositions containing oxidized high density polyethylene can contain from 0.1 to 10 percent, preferably 1 to 5 percent, and more preferably 3 to 5 percent based on the weight of the polypropylene of oxidized high density polyethylene. The oxidized high density polyethylene preferably has a molecular weight of from about 500 to 10,000 and more preferably from about 1500 to about 7000. The oxidized polyethylene preferably has an acid number of from about 5 to about 30 mg KOH/g, and preferably 15 to 25 mg KOH/g. The oxidized high density polyethylene imparts faster flow rates of the molten composition while maintaining physical properties. This processing aid enables the composition to retain physical properties during high temperature applications. The composition can be ground into a free flowing powder which can be blended with the talc. Preferably, the particle size is less than 20 mesh, more preferably from 10 to 100 mesh, yet more preferably from 10 to 50 mesh, and most preferably from 20 to 35 mesh. The composition results in injection molded articles having satisfactory surface appearance.

The oxidized high density polyethylene useful in the composition of the present invention can be prepared by the method disclosed in U.S. Pat. Nos. 3,434,993; 3,322,711; 3,153,025. Oxidized high density polyethylene (OHDPE) processing aids which can be used in the composition of the present invention are listed in Table II. OHDPE-4 is the most preferred oxidized high density polyethylene.

TABLE II

| OHDPE | Softening Point °C. (ASTM E-28) | Hardness dmm (ASTM D-5) | Density g/cc (ASTM D-5) | Viscosity 149° C. (Brookfield) | Acid Number mg KOH/g |
|---|---|---|---|---|---|
| 1 | 140 | <0.5 | 0.98 | 30,000 | 16 |
| 2 | 138 | <0.5 | 0.99 | 9,000 | 28 |
| 3 | — | <1.0 | — | >30,000 | 7 |
| 4 | — | <0.5 | — | 25,000 | 20 |

It is preferred to use oxidized high density polyethylene as processing aid in highly filled polypropylene compositions. A preferred composition is polypropylene containing 25 to 40 percent based on the weight of the talc, and 1 to 5 percent, and preferably 3 to 5 percent, based on the weight of the polypropylene of OHDPE-4.

In addition to the components discussed above, the composition of the present invention can contain additives commonly employed in polypropylene resin compositions, such as colorants, mold release agents, antioxidants, ultraviolet light stabilizers and the like.

The above described composition is particularly useful in forming and molding polypropylene. A preferred method of molding is injection molding. Where the processing aid is a free flowing powder, it can be physically blended with the talc, or talc and polypropylene by methods known in the art. A ribbon or Henschel blender can be used. The talc and processing aid can be melt blended with the polypropylene resin in a suitable melt blender such as an extruder or Banbury type internal mixer. Where the processing aid is a liquid, it can be fed directly into the melt blender with the polypropylene and the talc. The melt blended polypropylene composition can be formed by methods known in the art such as extrusion or injection molding.

Several examples are set forth below to illustrate the nature of the invention and the manner of carrying it out. However, the invention should not be considered as being limited to the details thereof.

EXAMPLES 1–3

Examples 1 through 3 illustrate the use of low molecular weight ethylene-vinyl acetate copolymer in a talc filled polypropylene composition. One percent by weight of Cabot-Sterling ® carbon black was introduced in the formulation in order to illustrate any surface changes that occurred. Any gloss, haze or texture change is more easily detected against a black surface. The polypropylene was Hercules Profax 6501 powdered propylene resin having a melt index of 4. The talc was 325 mesh Georgia talc. The talc used was from the North Georgia Mineral and Chemical Corp. The talc was No. GA 7-325 having a specific gravity of 2.7 and a pH value of 9.3. The talc was analyzed to have 42% silicone dioxide 28% magnesium dioxide, 0.15% calcium oxide, 1.00% aluminum oxide, 7% iron oxide, 0.3% alkalis, and a moisture loss @105° C. of 0.25%.

The polypropylene, talc, carbon black and ethylene-vinyl acetate copolymer were first physical blended using a Henschel high intensity mixer. The materials were blended for five minutes at 1800 rpm at room temperature. The final blends were free flowing powders.

The blended mixture was then compounded on a 2½ inch NRM extruder using a single stage screw. The extruder had a 4 to 1 compression ratio and a screen pack stack was used having 20, 50, 50, 20 mesh screens. The temperature profile of the extruder was: zone 1—182° C.; zone 2—190° C.; zone 3—200° C.; zone 4—205° C.; adaptor-210° C.; and die 210° C. The ethylene-vinyl acetate copolymer used was EVA-8 from Table I. The extruded composition was pelletized. The pelletized compositions were injection molded into 3 inch diameter discs for test specimens. The samples were injection molded on a 1.2 ounce Eagen injection molding machine. The temperature profile was: zone 1—210° C.; zone 2—221° C.; zone 3—227° C.; and zone 4—227° C.

Table III below summarizes the formulations used in Comparative 1 and Examples 1 through 3. The parts shown are parts by weight. Also included in Table III are the processing properties, the flow properties and the physical properties of comparative 1 in Examples 1 through 3. The processing properties include the power used in amps, the pressure in the extruder in psi, and the output rate in pounds per hour which were observed when using the noted extrusion conditions. The flow properties were measured by melt flow rate using the ASTM D1238-65 condition L test on extruded pellets, and a spiral flow test. The spiral flow molding conditions were measured on a 1.2 ounce Eagen injection molding unit. The spiral flow molding conditions were: zone 1—210° C.; zone 2—220° C.; zone 3—227° C.; zone 4—227° C.; mold-67° C. The injection pressure was $6.89 \times 10^{-6}$ kPa (1,000 psi) the total cycle time was 30 seconds and the screw speed was 60 rpm. The spiral mold cavity is 77 inches long, and the cross section of the spiral is a ⅛ inch diameter semi-circle. Spiral flow was measured according to a comparison with the length of the spiral in Comparative 1. The physical properties of the compositions were measured according to the ASTM D256-56 unnotched izod impact test on a ¼ inch sample at 25° C. (pounds per inch); tensile properties on ASTM D638-65 I test to obtain tensile strength, psi (pounds per square inch yield) and ultimate elongation (percent); flexural properties including flexural strength at 5 percent strain (psi), and modulus were measured on the ASTM D740-49 test. Heat deflection temperatures (HDT) in degrees Centigrade was measured at 264 psi according to ASTM D648.

TABLE III

|  | Comp. 1 | Ex. 1 | Ex. 2 | Ex. 3 |
| --- | --- | --- | --- | --- |
| Polypropylene | 100 | 100 | 100 | 100 |
| Talc | 40 | 40 | 40 | 40 |
| Carbon Black | 1 | 1 | 1 | 1 |

TABLE III-continued

|  | Comp. 1 | Ex. 1 | Ex. 2 | Ex. 3 |
| --- | --- | --- | --- | --- |
| EVA-8 | 0 | 1 | 3 | 5 |
| Processing |  |  |  |  |
| Amps | 23 | 22 | 21.5 | 21.0 |
| Pressure (psi) | 1190 | 1200 | 1200 | 1140 |
| Output Rate $\frac{lbs.}{hr.}$ | 46.8 | 47.9 | 43.1 | 42.6 |
| Flow |  |  |  |  |
| Melt Flow Rate g/10 min. | 1.9 | 2.7 | 3.7 | 4.6 |
| Spiral Flow % Increase in Length | — | 5 | 18 | 29 |
| Physical Properties |  |  |  |  |
| Unnotched Izod $\frac{ft. lbs.}{in.}$ | 4.8 | 4.8 | 5.0 | 5.0 |
| Tensile psi | 4900 | 4600 | 4500 | 4400 |
| Ult. Elong % | 35 | 25 | 40 | 45 |
| Flex. Str. psi | 7200 | 7000 | 6600 | 6300 |
| Flex. Mod. psi | 396000 | 383000 | 358000 | 344000 |
| HDT @ 264 psi °C. | 79 | 77 | 73 | 68 |

The processing property results indicate that a certain degree of lubrication is beginning to occur at 3 percent EVA-8. This is indicated by a decrease in output rate at three parts of EVA-8 and a decrease in pressure at five parts of EVA-8. This drop is not significant and can be corrected by changing the compounding parameters of the extruder such as by lowering the temperature. Generally, the processing results indicate no adverse processing affects with the compositions in Examples 1-3.

The flow properties are an important criteria in evaluating the processing aid in the talc filled polypropylene system to determine the affect on flow. As noted, this was evaluated in two ways: melt flow rate and spiral flow. The melt flow rate increased steadily with the addition of the EVA-8 and the percent increase in length of the spiral flow also increased with the amount of EVA-8.

The physical property is an indication of the affect of the addition of the ethylene-vinyl acetate copolymer. The physical properties indicate that impact resistance is not lost; however, there was a loss of heat deflection temperature. The injection molded parts using the ethylene-vinyl acetate were glossy with a smooth surface. Comparative 1, containing no additive, was duller in appearance.

EXAMPLES 4-6

Examples 4 through 6 illustrate a talc filled polypropylene blend containing oxidized high density polyethylene as a processing aid. One percent by weight, based on the polypropylene, of carbon black is used to more readily illustrate surface changes which occur. The polypropylene and talc used are the type used in Examples 1 through 3 and described above. The oxidized high density polyethylene used is a free flowing powder OHDPE-4 as described in Table II above. The polypropylene, talc, carbon black and oxidized high density polyethylene were blended in a Henschel high intensity blender in the same manner as in Examples 1 through 3. The final mixture was a homogeneous free flowing powder.

The mixture was evaluated on a 1.25 inch Brabender single screw extruder with a 3 to 1 compression ratio. The temperature profile was: zone 1—190° C.; zone 2—210° C.; zone 3—210° C.; zone 4—220° C.; and zone 5—220° C. The compounds were processed at 30 rpms and pelletized. Processing conditions were determined as a function of machine torque in milligrams. The flow properties and the physical properties were measured in the same manner as the physical properties in Examples 1-3. The physical properties were measured on samples injection molded from pellets. The formulations, and processing, flow, and physical property results are summarized in Table IV below.

TABLE IV

|  | Comp. 2 | Ex. 4 | Ex. 5 | Ex. 6 |
|---|---|---|---|---|
| Polypropylene | 100 | 100 | 100 | 100 |
| Talc | 40 | 40 | 40 | 40 |
| Carbon Black | 1 | 1 | 1 | 1 |
| OHDPE-4 | 0 | 1 | 3 | 5 |
| Processing |  |  |  |  |
| Torque (mg) | 7500 | 7400 | 6800 | 5600 |
| Flow |  |  |  |  |
| Melt Flow Rate g/10 min. | 2.6 | 3.3 | 5.1 | 5.8 |
| Physical Properties |  |  |  |  |
| Unnotched Izod ft. lbs./in. | 4.2 | 4.6 | 4.7 | 3.9 |
| Tensile psi | 4800 | 5100 | 5100 | 4900 |
| Ult. Elong. % | 35 | 30 | 30 | 25 |
| Flex. Str. psi | 7400 | 7700 | 7900 | 7500 |
| Flex. Mod. psi | 369000 | 363000 | 386000 | 366000 |
| HDT @ 264 psi °C. | 86 | 84 | 87 | 83 |

The processing results indicate that the torque decreased as greater levels of OHDPE-4 were added. However, the composition processed well even at the five percent level. The flow property as noted above is a major criteria for a processing aid in a talc filled polypropylene system. The flow data indicate an increase in flow with the addition of the OHDPE-4. The physical properties were generally maintained during the addition of the OHDPE from 1-5 percent. Especially noteworthy is the fact that the heat deflection temperature (HDT) was substantially constant.

EXAMPLES 7-12

Examples 7-12 illustrate talc filled polypropylene compositions containing an ethylene-vinyl acetate (EVA-7) processing aid. The polypropylene described in Examples 1-3 was used. The talc used was 200 mesh Georgia talc. The talc used was from the North Georgia Mineral and Chemical Corp. The talc was No. GA 7-200 having a specific gravity of 2.7 and a pH value of 9.3. The talc was analyzed to have 42% silicon dioxide, 28% magnesium dioxide, 4% calcium oxide, 4% aluminum oxide, 7% iron oxide, 0.2% alkalis, and a moisture loss @ 105° C. of 0.25%. The ethylene-vinyl acetate used is described as EVA-7 of Table I. As noted, EVA-7 is a liquid. The talc, and polypropylene in powder form were mixed in a Henschel high intensity mixer in the same manner as the blends in Examples 1-6. The mixture was then extruded through a Brabender extruder under the same conditions used in Examples 4-6. Flow properties were measured by melt flow rate according to ASTM D-1238-65 condition L and impact properties according to ASTM D256-56 at 23° C. (foot pounds per inch). Although the EVA-7 is a liquid, it was found that mixing it with the talc and the polypropylene in a high intensity mixture in the example levels resulted in a free flowing powder. The melt flow rate of polypropylene resin with no talc was measured at 3.8 for use as a control. The results of Examples 7-12 and Comparatives 3 and 4 are summarized in Table V below.

TABLE V

|  | Comp. 3 | Comp. 4 | Ex. 7 | Ex. 8 | Ex. 9 |
|---|---|---|---|---|---|
| Polypropylene | 100 | 100 | 100 | 100 | 100 |
| Talc (200 mesh) | — | 20 | 20 | 20 | 20 |
| EVA-7 | — | — | 1 | 3 | 5 |
| Processing |  |  |  |  |  |
| Torque (mg) | 5700 | 7700 | 7400 | 6700 | 4700 |
| Flow |  |  |  |  |  |
| Melt Flow Rate g/min. | 3.8 | 1.9 | 3.0 | 4.6 | 7.9 |
| Physical Properties |  |  |  |  |  |
| Unnotched Izod ft. lbs./in. |  |  |  |  |  |
| ¼ inch |  | 7.0 | 7.2 | 7.7 | 10.5 |
| ⅛ inch |  | 6.6 | 7.2 | 7.9 | 9.2 |
| Tensile PSI |  |  |  |  |  |
| Yield |  | 5400 | 5000 | 4500 | 4800 |
| Break |  | 4100 | 3000 | 2900 | 2300 |
| Elong % |  |  |  |  |  |
| Yield |  | 8.5 | 10.8 | 9.9 | 10.4 |
| Break |  | 35.6 | 43.9 | 54.4 | 61.3 |
| Ten. Mod. psi |  | 463000 | 416000 | 494000 | 390000 |
| Flex. Str. @ 5% psi |  | 7500 | 6700 | 6400 | 6300 |
| Flex. Mod. psi |  | 313000 | 296000 | 264000 | 255000 |
| HDT @ 264 psi °C. |  | 83 | 77 | 72 | 71 |

|  | Comp. 5 | Ex. 10 | Ex. 11 | Ex. 12 |
|---|---|---|---|---|
| Polypropylene | 100 | 100 | 100 | 100 |
| Talc (200 mesh) | 40 | 40 | 40 | 40 |
| EVA-7 | — | 1 | 3 | 5 |
| Processing |  |  |  |  |
| Torque (mg) | 7500 | 7300 | 7100 | 5400 |
| Flow |  |  |  |  |
| Melt Flow Rate g/min. | 1.9 | 3.5 | 5.7 | 7.4 |
| Physical Properties |  |  |  |  |
| Unnotched Izod ft. lbs./in. |  |  |  |  |
| ¼ inch | 4.8 | 5.2 | 6.3 | 6.5 |
| ⅛ inch | 4.8 | 5.5 | 6.6 | 6.8 |
| Tensile PSI |  |  |  |  |
| Yield | 5000 | 4600 | 4400 | 4300 |
| Break | 4000 | 3200 | 2800 | 3200 |
| Elong % |  |  |  |  |
| Yield | 8.0 | 8.9 | 10.4 | 9.8 |
| Break | 23.4 | 56.1 | 58.0 | 65.1 |
| Ten. Mod. psi | 526000 | 541000 | 513000 | 493000 |
| Flex. Str. @ 5% psi | 7900 | 7100 | 6600 | 6400 |
| Flex. Mod. psi | 410000 | 356000 | 330000 | 318000 |
| HDT @ 264 psi °C. | 89 | 82 | 75 | 73 |

A review of Table V shows that the addition of EVA-7, a low viscosity of ethylene-vinyl acetate copolymer, increases the melt flow rate. Additionally, and unexpectedly, it was found that using low viscosity ethylene-vinyl acetate copolymers such as EVA-7 resulted in an increase in the impact resistance as measured on the unnotched izod test. It is noted that generally, materials that improve the flow rate of a polymer tend to decrease the impact resistance. During the extrusion, some foaming of the materials was noted. Therefore, it is speculated that the low viscosity ethylene-vinyl acetate copolymer somehow reacts with the talc to improve the impact resistance. EVA-7 as described in Table I was mixed in a beaker at 150° C. with the above described talc. During and after blending, foaming and viscosity increases were noted. This is further evidence that a reaction was taking place which resulted in the improvement and impact properties observed using the EVA-7. The use of the ethylene-vinyl acetate copolymer resulted in a decrease in the heat deflection temperature (HDT).

EXAMPLES 13-18

Examples 13-18 illustrate the use of a low molecular weight ethylene-vinyl acetate copolymer (EVA-7, Table I), and the use of low molecular weight oxidized high density polyethylene (OHDPE-1, Table II) in a polypropylene composition containing 20 percent, based on the weight of the polypropylene, of 325 mesh Georgia talc of the type described in Examples 1-3. The polypropylene is the same type as in Examples 1-3. The compositions were blended and extruded using the same method as in Examples 4-6. The formulations, and processing, flow, and physical property results are summarized in Table VI below:

TABLE VI

|  | Comp. 6 | Comp. 7 | Ex. 13 | Ex. 14 |
|---|---|---|---|---|
| Polypropylene | 100 | 100 | 100 | 100 |
| Talc | — | 20 | 20 | 20 |
| OHDPE-1 | — | — | 1 | 3 |
| EVA-7 | — | — | — | — |
| *Processing* | | | | |
| Torque (mg) | 5700 | 7700 | 7000 | 6500 |
| *Flow* | | | | |
| Melt Flow Rate g/10 min. | — | 1.7 | 4.1 | 4.9 |
| *Physical Properties* | | | | |
| Unnotched Izod ft. lbs./in. (¼″) | | 7.3 | 6.5 | 6.0 |
| Tensile Str. PSI | | | | |
| Yield | | 5100 | 5000 | 5100 |
| Break | | 3400 | 3400 | 3800 |
| Elong % | | | | |
| Yield | | 9.8 | 10.9 | 10.1 |
| Break | | 43.1 | 30.4 | 28.6 |
| Ten. Mod. psi | | 372000 | 322000 | 324000 |
| Flex. Str. psi @ 5% | | 8100 | 7700 | 32400 |
| Flex. Mod. psi | | 328000 | 325000 | 326000 |
| HDT at 264 psi °C. | | 82 | 76 | 80 |

|  | Ex. 15 | Ex. 16 | Ex. 17 | Ex. 18 |
|---|---|---|---|---|
| Polypropylene | 100 | 100 | 100 | 100 |
| Talc | 20 | 20 | 20 | 20 |
| OHDPE-1 | 5 | — | — | — |
| EVA-7 | — | 1 | 3 | 5 |
| *Processing* | | | | |
| Torque (mg) | 5800 | 7300 | 6500 | 4700 |
| *Flow* | | | | |
| Melt Flow Rate g/10 min. | 6.3 | 4.2 | 4.8 | 9.0 |
| *Physical Properties* | | | | |
| Unnotched Izod ft. lbs./in. (¼″) | — | 6.9 | 8.5 | 7.9 |
| Tensile Str. PSI | | | | |
| Yield | 4900 | 4800 | 4700 | 4500 |
| Break | 3900 | 3000 | 2600 | 2500 |
| Elong % | | | | |
| Yield | 9.5 | 10.7 | 11.4 | 11.0 |
| Break | 28.1 | 51.3 | 61.3 | 61.9 |
| Ten. Mod. psi | 339000 | 347000 | 347000 | 316000 |
| Flex. Str. psi @ 5% | — | 7400 | 7200 | 6800 |
| Flex. Mod. psi | — | 320000 | 305000 | 284000 |
| HDT at 264 psi, °C. | — | 80 | 72 | 71 |

The processing results indicate that the torque decreased as greater levels of EVA-7 and OHDPE-1 were added. The use of EVA-7 caused greater decreases in torque and increases in melt flow rate than the OHDPE-1. The EVA-7 caused the heat deflection temperature to decrease, while the impact resistance values increased. The OHDPE-1 caused the impact resistance to decrease slightly, while maintaining the heat deflection temperature.

EXAMPLES 19-38

Examples 19-38 illustrate the use of low molecular weight oxidized high density polyethylene samples OHDPE-1 and OHDPE-3, as described in Table II, in talc filled polypropylene compositions. The polypropylene is the type described in Examples 1-3. The talc is 200 mesh Georgia talc of the type described in Examples 7-12. The compositions were blended and extruded using the same method as in Examples 4-6. Tables VIIA, VIIB, VIIC, and VIID summarize the processing, flow and physical properties of compositions of various levels of OHDPE-1 and OHDPE-3 with 20 and 40 percent by weight based on the weight of the polypropylene of talc. The Izod Impact testing was on ¼ inch thick samples.

TABLE VIIA

|  | Comp. 8 | Ex. 19 | Ex. 20 |
|---|---|---|---|
| Polypropylene | 100 | 100 | 100 |
| Talc (200 mesh) | 20 | 20 | 20 |
| OHDPE-1 | — | 1 | 3 |
| *Processing* | | | |
| Torque (mg) | 7700 | 7600 | 6700 |
| *Flow* | | | |
| Melt Flow Rate g/10 min. | 2.2 | 2.7 | 3.3 |
| *Physical Properties* | | | |
| Unnotched Izod (¼″) ft. lbs./in. | 5.9 | 6.2 | 6.3 |
| *Tensile* | | | |
| Yield Str. psi | 5200 | 5200 | 5300 |
| Ult. Elong. % | 25 | 25 | 40 |
| Flex. Str. @ 5% psi | 7800 | 7700 | 7800 |
| Flex. Mod. psi | 315000 | 315000 | 313000 |
| HDT @ 264 psi, °C. | 81 | 83 | 75 |

|  | Ex. 21 | Ex. 22 | Ex. 23 |
|---|---|---|---|
| Polypropylene | 100 | 100 | 100 |
| Talc (200 mesh) | 20 | 20 | 20 |
| OHDPE-1 | 5 | 7 | 10 |
| *Processing* | | | |
| Torque (mg) | 5500 | 4400 | 4100 |
| *Flow* | | | |
| Melt Flow Rate g/10 min. | 3.8 | 6.0 | 7.0 |
| *Physical Properties* | | | |
| Unnotched Izod (¼″) ft. lbs./in. | 5.6 | 5.4 | 5.3 |
| *Tensile* | | | |
| Yield Str. psi | 5200 | 5100 | 5200 |
| Ult. Elong. % | 45 | 25 | 25 |
| Flex. Str. @ 5% psi | 7300 | 7200 | 7600 |
| Flex. Mod. psi | 293000 | 277000 | 309000 |
| HDT @ 264 psi °C. | 76 | 75 | 78 |

TABLE VIIB

|  | Comp. 9 | Ex. 24 | Ex. 25 |
|---|---|---|---|
| Polypropylene | 100 | 100 | 100 |
| Talc (200 mesh) | 40 | 40 | 40 |
| OHDPE-1 | — | 1 | 3 |
| *Processing* | | | |
| Torque (mg) | 7500 | 7400 | 6800 |
| *Flow* | | | |
| Melt Flow Rate g/10 min. | 2.8 | 3.2 | 5.0 |
| *Physical Properties* | | | |
| Unnotched Izod (¼″) ft. lbs./in. | 4.2 | 4.6 | 4.1 |
| *Tensile* | | | |
| Yield Str. psi | 4800 | 5100 | 5100 |
| Ult. Elong. % | 35 | 30 | 30 |
| Flex. Str. @ 5% psi | 7400 | 7700 | 7900 |
| Flex. Mod. psi | 369000 | 363000 | 386000 |

TABLE VIIB-continued

| HDT @ 264 psi °C. | 86 | 84 | 87 |
|---|---|---|---|
| | Ex. 26 | Ex. 27 | Ex. 28 |
| Polypropylene | 100 | 100 | 100 |
| Talc (200 mesh) | 40 | 40 | 40 |
| OHDPE-1 | 5 | 7 | 10 |
| Processing | | | |
| Torque (mg) | 5600 | 4800 | 4200 |
| Flow | | | |
| Melt Flow Rate g/10 min. | 5.2 | 6.4 | 8.0 |
| Physical Properties | | | |
| Unnotched Izod (⅛″) ft. lbs./in. | 3.9 | 3.3 | — |
| Tensile | | | |
| Yield Str. psi | 4900 | 4800 | — |
| Ult. Elong. % | 25 | 15 | — |
| Flex. Str. @ 5% psi | 7500 | 7600 | — |
| Flex. Mod. psi | 366000 | 391000 | — |
| HDT @ 264 psi °C. | 83 | 82 | — |

TABLE VIIC

| | Comp. 8 | Ex. 29 | Ex. 30 |
|---|---|---|---|
| Polypropylene | 100 | 100 | 100 |
| Talc (200 mesh) | 20 | 20 | 20 |
| OHDPE-3 | — | 1 | 3 |
| Processing | | | |
| Torque (mg) | 7700 | 7000 | 6500 |
| Flow | | | |
| Melt Flow Rate g/10 min. | 2.2 | 2.7 | 3.3 |
| Physical Properties | | | |
| Unnotched Izod (⅛″) ft. lbs./in. | 5.9 | 5.6 | 5.9 |
| Tensile | | | |
| Yield Str. psi | 5200 | 5200 | 5300 |
| Ult. Elong. % | 25 | 30 | 25 |
| Flex. Str. @ 5% psi | 7800 | 8100 | 7700 |
| Flex. Mod. psi | 315000 | 323000 | 317000 |
| HDT @ 264 psi °C. | 81 | 83 | 84 |
| | Ex. 31 | Ex. 32 | Ex. 33 |
| Polypropylene | 100 | 100 | 100 |
| Talc (200 mesh) | 20 | 20 | 20 |
| OHDPE-3 | 5 | 7 | 10 |
| Processing | | | |
| Torque (mg) | 6200 | 5800 | 5400 |
| Flow | | | |
| Melt Flow Rate g/10 min. | 3.8 | 6.0 | 7.0 |
| Physical Properties | | | |
| Unnotched Izod (⅛″) ft. lbs./in. | 5.9 | 5.5 | 5.3 |
| Tensile | | | |
| Yield Str. psi | 5300 | 5100 | 5100 |
| Ult. Elong. % | 30 | 20 | 20 |
| Flex. Str. @ 5% psi | 7700 | 7500 | 7500 |
| Flex. Mod. psi | 0000 | 306000 | 316000 |
| HDT @ 264 psi °C. | 77 | 78 | 75 |

TABLE VIID

| | Comp. 9 | Ex. 34 | Ex. 35 |
|---|---|---|---|
| Polypropylene | 100 | 100 | 100 |
| Talc (200 mesh) | 20 | 20 | 20 |
| OHDPE-3 | — | 1 | 3 |
| Processing | | | |
| Torque (mg) | 7700 | 7000 | 6500 |
| Flow | | | |
| Melt Flow Rate g/10 min. | 2.2 | 2.7 | 3.3 |
| Physical Properties | | | |
| Unnotched Izod (⅛″) ft. lbs./in. | 5.9 | 5.6 | 5.9 |
| Tensile | | | |
| Yield Str. psi | 5200 | 5200 | 5300 |
| Ult. Elong. % | 25 | 30 | 25 |
| Flex. Str. @ 5% psi | 7800 | 8100 | 7700 |
| Flex. Mod. psi | 315000 | 323000 | 317000 |
| HDT @ 264 psi °C. | 81 | 83 | 84 |
| | Ex. 36 | Ex. 37 | Ex. 38 |
| Polypropylene | 100 | 100 | 100 |
| Talc (200 mesh) | 40 | 40 | 40 |
| OHDPE-3 | 5 | 7 | 10 |
| Processing | | | |
| Torque (mg) | 5300 | 5300 | 5000 |
| Flow | | | |
| Melt Flow Rate g/10 min. | 4.9 | 5.2 | 6.0 |
| Physical Properties | | | |
| Unnotched Izod (⅛″) ft. lbs./in. | 3.7 | 3.6 | 3.5 |
| Tensile | | | |
| Yield Str. psi | 5100 | 5100 | 5000 |
| Ult. Elong. % | 25 | 25 | 20 |
| Flex. Str. @ 5% psi | 7800 | 7700 | 7800 |
| Flex. Mod. psi | 384000 | 367000 | 387000 |
| HDT @ 264 psi °C. | 82 | 83 | 79 |

The use of OHDPE-1 or OHDPE-3 caused the torque to decrease and the melt flow rate to increase. The impact resistance generally decreased slightly and the HDT values were maintained.

EXAMPLES 39–44

Examples 39–44 illustrate the effect of low molecular weight oxidized high density polyethylene OHDPE-4 (Table II) and ethylene-vinyl acetate copolymer EVA-8 (Table I) in talc filled polypropylene compositions on melt flow and molding pressure. The polypropylene and talc used are described in Examples 1–3. The compositions were blended and extruded using the same method as Examples 1–3.

The melt flow rate was determined using ASTM-D1238-65. This test is normally conducted at 230° C. Melt flow rates were measured at 200° C., 210° C., 220° C., and 230° C. Mold flow and pressures were determined used a spiral mold. The composition was injection molded using an 1.2 ounce Eagan injection molding machine at 60 rpm with zone 1—227° C.; zone 2—270° C.; zone 3—227° C.; zone 4—227° C.; die—67° C. and mold—67° C. The cycle time was 30 seconds. Physical properties were measured according to the procedures described in Examples 1–3. The results are summarized in Table VIII.

TABLE VIII

| | Comp. 10 | Ex. 39 | Ex. 40 |
|---|---|---|---|
| Polypropylene | 100 | 100 | 100 |
| Talc | 20 | 20 | 20 |
| EVA-8 | — | 3 | 5 |
| OHDPE-4 | — | — | — |
| Melt Flow Rate (g/10 min.) | | | |
| @200° C. | 1.2 | 2.0 | 2.9 |
| 210° C. | 1.6 | 2.7 | 3.8 |
| 220° C. | 2.0 | 3.4 | 4.8 |
| 230° C. | 2.3 | 4.6 | 6.4 |
| Spiral Flow (length inches) | | | |
| Injection Pressure 1500 psi | 16.25 | 19.25 | 22.00 |
| Injection Pressure 1200 psi | 14.25 | 17.13 | 18.75 |
| Injection Pressure (psi) | | | |

TABLE VIII-continued

|  |  |  |  |
|---|---|---|---|
| To Get 14.25 inches of Spiral Flow | 1200 | 875 | 850 |
| To Get 12.75 inches of Spiral Flow |  |  |  |
| To Get 16.25 inches of Spiral Flow | 1500 | 1050 | 950 |
| Physical Properties |  |  |  |
| Unnotched Izod ft. lbs./in. | 5.6 | 5.8 | 6.0 |
| Tensile Str. at Brk. psi | 4300 | 3900 | 3700 |
| % Elong at Brk. | 19.1 | 14.1 | 13.8 |
| Flex. Str. @ 5% psi | 7900 | 6800 | 6500 |
| Flex. Mod. psi | 360000 | 299000 | 298000 |
| HDT @ 264 psi °C. | 77 | 66 | 66 |

|  | Comp. 11 | Ex. 41 | Ex. 42 | Ex. 43 | Ex. 44 |
|---|---|---|---|---|---|
| Polypropylene | 100 | 100 | 100 | 100 | 100 |
| Talc | 40 | 40 | 40 | 40 | 40 |
| EVA-8 | — | 3 | 5 | — | — |
| OHDPE-4 | — | — | — | 3 | 5 |
| Melt Flow Rate (g/10 min.) |  |  |  |  |  |
| @200° C. | 1.2 | 1.5 | 1.7 | 1.2 | 1.3 |
| 210° C. | 1.4 | 2.0 | 2.1 | 1.7 | 1.9 |
| 220° C. | 1.6 | 2.5 | 2.7 | 2.0 | 2.2 |
| 230° C. | 2.2 | 3.5 | 3.5 | 2.6 | 3.0 |
| Spiral Flow (length inches) |  |  |  |  |  |
| Injection Pressure 1500 psi | 14.25 | 19.25 | 22.00 | 14.75 | 15.25 |
| Injection Pressure 1200 psi | 12.75 | 14.25 | 14.50 | 13.50 | 13.75 |
| Injection Pressure (psi) |  |  |  |  |  |
| To Get 14.25 inches of Spiral Flow | 1500 | 925 | 1025 |  |  |
| To Get 12.75 inches of Spiral Flow | 1200 | 750 | 940 |  |  |
| To Get 16.25 inches of Spiral Flow |  |  |  |  |  |
| Physical Properties |  |  |  |  |  |
| Unnotched Izod ft. lbs./in. | 3.4 | 4.1 | 4.0 |  |  |
| Tensile Str. at Brk. psi | 4200 | 3800 | 3500 |  |  |
| % Elong at Brk. | 6.2 | 8.9 | 10.7 |  |  |
| Flex. Str. @ 5% psi | 7800 | 6900 | 6700 |  |  |
| Flex. Mod. psi | 475000 | 408000 | 399000 |  |  |
| HDT @ 264 psi °C. | 84 | 70 | 65 |  |  |

The results of the melt flow rate and spiral flow tests indicate that using EVA-8 or OHDPE-4 enables the mold temperature and/or pressure to be reduced while obtaining equal or better melt flow in the mold. Physical properties measured for the EVA-8 indicate that impact properties are maintained and HDT values decrease with 20 and 40 percent talc filled polypropylene compositions.

EXAMPLES 45–50

Examples 45–50 illustrate the effect of low molecular weight ethylene-vinyl acetate copolymer, EVA-8 (Table I) and oxidized high density polyethylene OHDPE-4 (Table II) in talc filled polypropylene compositions on surface appearance. The polypropylene used and talc are described in Examples 1–3. The compositions contained one percent by weight of the polypropylene of the carbon black described in Examples 1–3. The compositions were blended and extruded using the same method as Examples 1–3.

Three inch discs were molded in the same manner as described in Examples 1–3. Surface appearance was measured using a Gardner 60° C. gloss meter according to ASTM D523. Gloss was measured parallel and perpendicular to flow into the mold. Physical properties were measured according to the procedures used in Examples 1–3. The results are summarized in Tables IXA and IXB.

TABLE IXA

|  | Comp. 12 | Ex. 45 | Ex. 46 | Ex. 47 |
|---|---|---|---|---|
| Polypropylene | 100 | 100 | 100 | 100 |
| Talc | 30 | 30 | 30 | 30 |
| Carbon Black | 1 | 1 | 1 | 1 |
| EVA-8 | — | 1 | 3 | 5 |
| Carbon Black | 1 | 1 | 1 | 1 |
| Gloss Reading |  |  |  |  |
| Perpendicular to Flow | 58.2 | 60.5 | 69.2 | 75.8 |
| Parallel to Flow | 43.8 | 51.0 | 62.8 | 67.2 |

TABLE IXB

|  | Comp. 13 | Ex. 48 | Ex. 49 | Ex. 50 |
|---|---|---|---|---|
| Polypropylene | 100 | 100 | 100 | 100 |
| Talc (200 mesh) | 30 | 30 | 30 | 30 |
| Carbon Black | 1 | 1 | 1 | 1 |
| OHDPE-4 | — | 1 | 3 | 5 |
| Gloss Reading |  |  |  |  |
| Perpendicular to Flow | 55 | 70 | 72 | 72 |
| Parallel to Flow | 50 | 65 | 68 | 67 |
| Flow |  |  |  |  |
| Melt Flow Rate g/10 min. | 2.2 | — | 2.7 | 3.9 |
| Physical Properties |  |  |  |  |
| Unnotched Izod ft. lbs./in. | 4.2 | — | 4.7 | 3.9 |
| Tensile Str. at Brk. psi | 4800 | — | 5100 | 4900 |
| % Elong at Brk. | 35 | — | 30 | 25 |
| Flex. Str. @ 5% psi | 7400 | — | 7900 | 3500 |
| Flex. Mod. psi | 369000 | — | 386000 | 366000 |
| HDT @ 264 psi °C. | 86 | — | 87 | 83 |

The results indicate that EVA-8 and OHDPE-4 both increase the glass values. The physical property results for OHDPE-4 show that HDT values were maintained and the impact resistance decreased with the increase of the level of OHDPE.

While exemplary embodiments of the invention have been described, the true scope of the invention is to be determined from the following claims:

What is claimed is:

1. A composition comprising:
polypropylene;
from 1 percent to 50 percent based on the weight of the polypropylene of talc;
from 0.1 percent to 10 percent based on the weight of the polypropylene of an ethylene-vinyl acetate copolymer having from 2 to 45 percent by weight of the vinyl acetate moiety and a Brookfield viscosity at 140° C. of from 300 centipoises to 700 centipoises.

2. The composition as recited in claim 1 wherein there is from 1 percent to 5 percent based on the weight of the polypropylene of the ethylene-vinyl acetate.

3. The composition as recited in claim 2 wherein there is from 3 percent to 5 percent based on the weight of the polypropylene of the ethylene-vinyl acetate.

4. The composition as recited in claim 1 wherein the ethylene-vinyl acetate copolymer has from 10 to 16 percent by weight of the vinyl acetate moiety.

5. The composition as recited in claims 1 or 2 wherein the ethylene-vinyl acetate copolymer has a Brookfield viscosity at 140° C. of from about 475 centipoises to 500 centipoises.

6. The composition as recited in claim 4 wherein the ethylene-vinyl acetate is a free flowing powder having an average particle size of less than 35 mesh.

7. The composition as recited in claim 1 wherein the Brookfield viscosity at 140° C. of ethylene-vinyl acetate copolymer is from 300 centipoises to 500 centipoises.

8. The composition as recited in claim 7 wherein the Brookfield viscosity at 140° C. of ethylene-vinyl acetate is from 300 to 400 centipoises.

9. The composition as recited in claim 1 wherein there is from 5 percent to 45 percent based on the weight of the polypropylene of talc.

10. The composition as recited in claim 1 wherein there is from 10 to 25 percent based on the weight of the polypropylene of talc, and 1 to 5 percent based on the weight of the polypropylene of ethylene-vinyl acetate copolymer.

11. The composition as recited in claim 10 wherein there is from 3 to 5 percent based on the weight of the polypropylene of ethylene-vinyl acetate copolymer.

12. The composition as recited in claim 11 wherein the ethylene-vinyl acetate copolymer is has a hardness 7.0–13 (ASTM D-5), Brookfield viscosity at 140° C. of 475–500 and a 10–14 wt % vinyl acetate content.

13. The composition as recited in claim 1 wherein the processing aid is melt blended with the polypropylene and the talc.

14. The composition as recited in claim 1 wherein the ethylene vinyl acetate copolymer has a molecular weight of from 500 to 5,000.

* * * * *